US008989090B2

(12) United States Patent
Das

(10) Patent No.: US 8,989,090 B2
(45) Date of Patent: Mar. 24, 2015

(54) INTER-NODE COMMUNICATION METHOD AND SYSTEM

(75) Inventor: Samir Ranjan Das, Melville, NY (US)

(73) Assignee: The Research Foundation for The State University of New York, Albany, NY (US)

(*) Notice: Subject to any disclaimer, the term of this patent is extended or adjusted under 35 U.S.C. 154(b) by 295 days.

(21) Appl. No.: 13/492,352

(22) Filed: Jun. 8, 2012

(65) Prior Publication Data

US 2012/0307728 A1 Dec. 6, 2012

Related U.S. Application Data

(63) Continuation-in-part of application No. PCT/US2010/059758, filed on Dec. 9, 2010.

(60) Provisional application No. 61/285,069, filed on Dec. 9, 2009.

(51) Int. Cl.
*H04W 4/00* (2009.01)
*H04W 40/18* (2009.01)
*H04W 40/06* (2009.01)
*H04W 16/28* (2009.01)

(52) U.S. Cl.
CPC .............. *H04W 40/18* (2013.01); *H04W 40/06* (2013.01); *H04W 16/28* (2013.01)
USPC ........................................................ 370/328

(58) Field of Classification Search
None
See application file for complete search history.

(56) References Cited

U.S. PATENT DOCUMENTS

| 5,761,431 | A | 6/1998 | Gross et al. |
| 6,680,950 | B1 | 1/2004 | Nagata et al. |
| 6,757,553 | B1 | 6/2004 | English |
| 7,013,141 | B2 | 3/2006 | Lindquist et al. |
| 7,206,584 | B2 | 4/2007 | Abusch-Magder et al. |
| 7,266,386 | B2 | 9/2007 | Kim et al. |
| 7,369,512 | B1 | 5/2008 | Shurbanov et al. |
| 7,982,659 | B2 | 7/2011 | Laufer |
| 2003/0109285 | A1* | 6/2003 | Reed et al. ............ 455/562 |
| 2005/0196280 | A1 | 9/2005 | Gonzalez et al. |
| 2007/0171396 | A1 | 7/2007 | Harris et al. |
| 2009/0039651 | A1* | 2/2009 | Stiesdal ................ 290/44 |

(Continued)

FOREIGN PATENT DOCUMENTS

| KR | 1020090080551 | 7/2009 |
| KR | 1020090122133 | 11/2009 |

OTHER PUBLICATIONS

Nasipuri, Asis et al., On-Demand Routing Using Directional Antennas in Mobile Ad Hoc Networks, 2000 IEEE, pp. 535-541.

(Continued)

*Primary Examiner* — Kouroush Mohebbi
(74) *Attorney, Agent, or Firm* — The Farrell Law Firm, P.C.

(57) ABSTRACT

Disclosed is a data transmission system having a multi-node wireless network in a geographic area within which a plurality of nodes are positioned, having a plurality of directional antennas fixed to respective nodes of the plurality of nodes, with each node including at least two directional antennas to transmit and receive in respective sectors emanating from each respective node. When yaw of a node exceeds a threshold amount, revised routing information is provided to identify preferred directional antennas for use in future link transmissions.

11 Claims, 3 Drawing Sheets

(56) References Cited

U.S. PATENT DOCUMENTS

2010/0138182 A1    6/2010  Jammu et al.
2010/0138751 A1*   6/2010  Kumar et al. ................. 715/736

OTHER PUBLICATIONS

Perkins, C. et al., Ad hoc On-Demand Distance Vector (AODV) Routing, The Internet Society (2003), 37 pages.

Choudhury, Romit Roy et al., Impact of Directional Antennas on Ad Hoc Routing, M. Conti et al. (Eds.): PWC 2003, LNCS 2775, pp. 590-600, IFIP International Federation for Information Processing 2003.

Lim, H. et al., Flooding in wireless ad hoc networks, Computer Communications 24 (2001) pp. 353-363, 2001 Elsevier Science B.V.

Peng, Wei et al., On the Reduction of Broadcast Redundancy in Mobile Ad Hoc Networks, 2000 IEEE, pp. 129-130.

Ramanathan, Ram et al., Ad Hoc Networking With Directional Antennas: A Complete System Solution, IEEE Journal on Selected Areas in Communications, vol. 23, No. 3, Mar. 2005, pp. 496-506.

Goldengorin, Boris et al., How to Make a Greedy Heuristic for the Asymmetric Traveling Salesman Problem Competitive, 16 pages.

PCT/ISA/237 Written Opinion issued on PCT/US2010/059758, 4 pages.

PCT/ISA/210 Search Report issued on PCT/US2010/059758, 3 pages.

* cited by examiner

C

D

B

100

INTER-NODE COMMUNICATION METHOD AND SYSTEM

PRIORITY

This application claims priority to U.S. Provisional Application No. 61/285,069, filed Dec. 9, 2009, and is a Continuation In Part of International Application PCT/US2010/059758, with an international filing date of Dec. 9, 2010, the contents of each of which are incorporated herein by reference.

BACKGROUND OF THE INVENTION

1. Field of the Invention

The disclosed method relates generally to wireless network communication techniques and, in particular, to a method and system for network-wide broadcast via hopping between nodes equipped with directional antennas, with rebroadcast restricted based on node location and yawing position.

2. Background of the Related Art

Conventional wind farms have multiple wind turbines. Each turbine typically has a nacelle located at an upper portion thereof, onto which turbine blades are rotatably connected. Each nacelle of each wind turbine in the wind farm will yaw about a vertical axis, to position the nacelle and turbine blades into the wind for maximum power production. See U.S. Publ. No. 2005/0196280 A1 to Gonzalez et al. and U.S. Publ. No. 2010/0109327 A1 to Nielson et al., the contents of which are incorporated herein by reference.

The need for each of the multiple turbines in the wind farm to wirelessly communicate is well recognized, for reasons that include but are not limited to efficient and reliable propagation of aircraft approach alert signals to activate an anti-collision warning light located on each nacelle.

Wireless communication protocols are well known. Conventional protocols include a random access protocol, such as Carrier Sense Multiple Access with Collision Avoidance (CSMA/CA). See IEEE 802.11 Wireless Local Area Network ("WLAN") standard and U.S. Pat. Nos. 5,761,431 and 6,680,950, the contents of which are incorporated herein by reference.

In such conventional methods, a same wireless communication channel is typically utilized for all nodes in a network, avoiding the need to coordinate between the transmitter and receiver of a link to select a communication channel. A multi-hop wireless routing is needed when source and destination nodes are not connected by a direct link. Multi-hop routing is typically achieved by relaying packets over multiple links, i.e. hops that involve intermediate nodes. Such routing can be unicast or broadcast.

For unicast routing, a source node sends the packet to a specific destination node located one or more hops away. A routing protocol at the network layer determines a next hop node to forward the packet via a link layer transmission.

For broadcast routing, a source node sends the packet to all nodes in the network. Broadcast routing, sometimes referred to as 'flooding', is typically used to distribute network wide control or management information, as described in U.S. Pat. No. 7,369,512, the contents of which are incorporated herein by reference.

Omni-directional antennas are typically used to facilitate flooding since all neighboring nodes will receive the packet using a single link layer broadcast and will relay the packet by link layer broadcast. For example, in a naïve flooding broadcast method a source node broadcasts a packet via a single link layer broadcast. Any other node, upon receiving a packet for the first time, rebroadcasts the packet via a single link layer broadcast. When a node receives the rebroadcast of same packet, a duplicate, i.e. rebroadcast, packet is ignored to prevent endless rebroadcast throughout the network.

To recognize duplicate packets, a unique signature is typically provided in a packet header. The originating or source node inserts the signature in the packet header. In this example method of naïve flooding, every node in a network having 'N' number of nodes will transmit via a broadcast transmission at the link layer each unique packet only once, resulting in N number of transmissions of each packet.

However, naïve flooding is inefficient since nodes having links that are linked to more than one other node will receive the same packet more than once. Accordingly, to improve network efficiency and to reduce packet loss due to packet collisions in a shared wireless channel, there is a need to achieve network-wide broadcast utilizing less than N packet transmissions.

For wireless communication between wind farm turbines, it has been proposed to use directional antennas instead of omni-directional antennas. In a directional antenna, wireless communication is restricted to a sector for reasons that include reduction of interference and providing longer transmission range. Multiple directional antennas with non-overlapping sectors are used in a node to cover the entire circle. However, conventional use of directional antennas fails to account for yawing of the wind turbine as they also rotate along with the node itself. Conventional systems also fail to provide a method to reduce congestion of a shared transmission channel as each antenna broadcasts the packet once to implement flooding. Thus, in a network with N nodes and k directional antennas per node, with k being equal to or greater than two, N*k packet transmission are required, resulting in network congestion and packet collisions.

SUMMARY OF THE INVENTION

The disclosed method overcomes the above shortcomings by providing a data transmission system and method in a multi-node wireless network that includes a plurality of nodes having an established geographic position, within which multi-hop routing is performed between the nodes, each node including at least two directional antennas for transmitting and receiving signals in respective first and second sectors emanating from each node. Routing information is stored of aligned sectors of adjacent nodes, with yaw of a node beyond a threshold amount identifying a change of alignment of adjacent node sectors, with revised routing information then being calculated and transmitted.

In a preferred embodiment, a system for wireless data transmission in a wind farm is provided, with each wind turbine having at least two directional antennas mounted thereon, and each directional antenna focused in different sectors emanating from each respective node. Routing information is provided to identify alignment of directional antennas of adjacent nodes and a data packet that is transmitted by one node is wirelessly rebroadcast by nodes adjacent to each other node utilizing directional antennas specified by the routing information. When turbine yaw exceeds a threshold amount, revised routing information is calculated and transmitted to each node. Rebroadcast of subsequent data packets is then performed by directional antennas identified by the revised routing information.

In another preferred embodiment, wireless data transmission is performed on a wind farm by mapping geographical positions of each node in the wind farm, with each node corresponding to a wind turbine having two or more directional antennas mounted thereon, and each directional antenna focused on a different sector emanating from the node. Mapped positions are stored in a database and each node is provided with a preferred link transmission table that identifies aligned directional antennas of adjacent nodes. When the yaw of any wind turbine is determined to exceed a threshold yaw amount, a revised preferred link transmission table is calculated based on the determined yaw, and the calculated revised preferred link transmission table is transmitted to each node so that packet retransmission, i.e. rebroadcast, is performed by directional antennas identified in the revised preferred link transmission table. Each wind turbine independently rotates about a vertical axis. Preferably, the directional antennas are mounted on a nacelle of the wind turbine and different sectors do not overlap.

In yet another embodiment, a system for data transmission in a multi-node wireless network is provided in which a plurality of nodes each have a plurality of directional antennas fixed thereon, and each directional antenna is focused in a different sector emanating from a node on which the antenna is mounted. Routing information is provided to identify aligned sectors of adjacent nodes. Changed alignment of adjacent sectors is identified when rotation of a node exceeds a threshold amount, with revised routing information then being provided for data packet rebroadcast between adjacent nodes utilizing directional antennas identified by the revised routing information.

BRIEF DESCRIPTION OF THE DRAWINGS

The above and other objects, features and advantages of certain embodiments of the present invention will be more apparent from the following detailed description taken in conjunction with the accompanying drawings, in which.

DETAILED DESCRIPTION OF THE PREFERRED EMBODIMENTS

The following detailed description of preferred embodiments will be made in reference to the accompanying drawings. In the description provided herein, an explanation of related functions or constructions known in the art is omitted for the sake of clarity to avoid obscuring the invention with unnecessary detail.

In the disclosed method, restrictions on rebroadcast of network messages are established based on static factors of network topography and established positions of nodes therein, and a dynamic factor of present yaw angle, thereby improving network efficiency, and reducing packet loss due to shared transmission channel collisions.

Figure 1A:
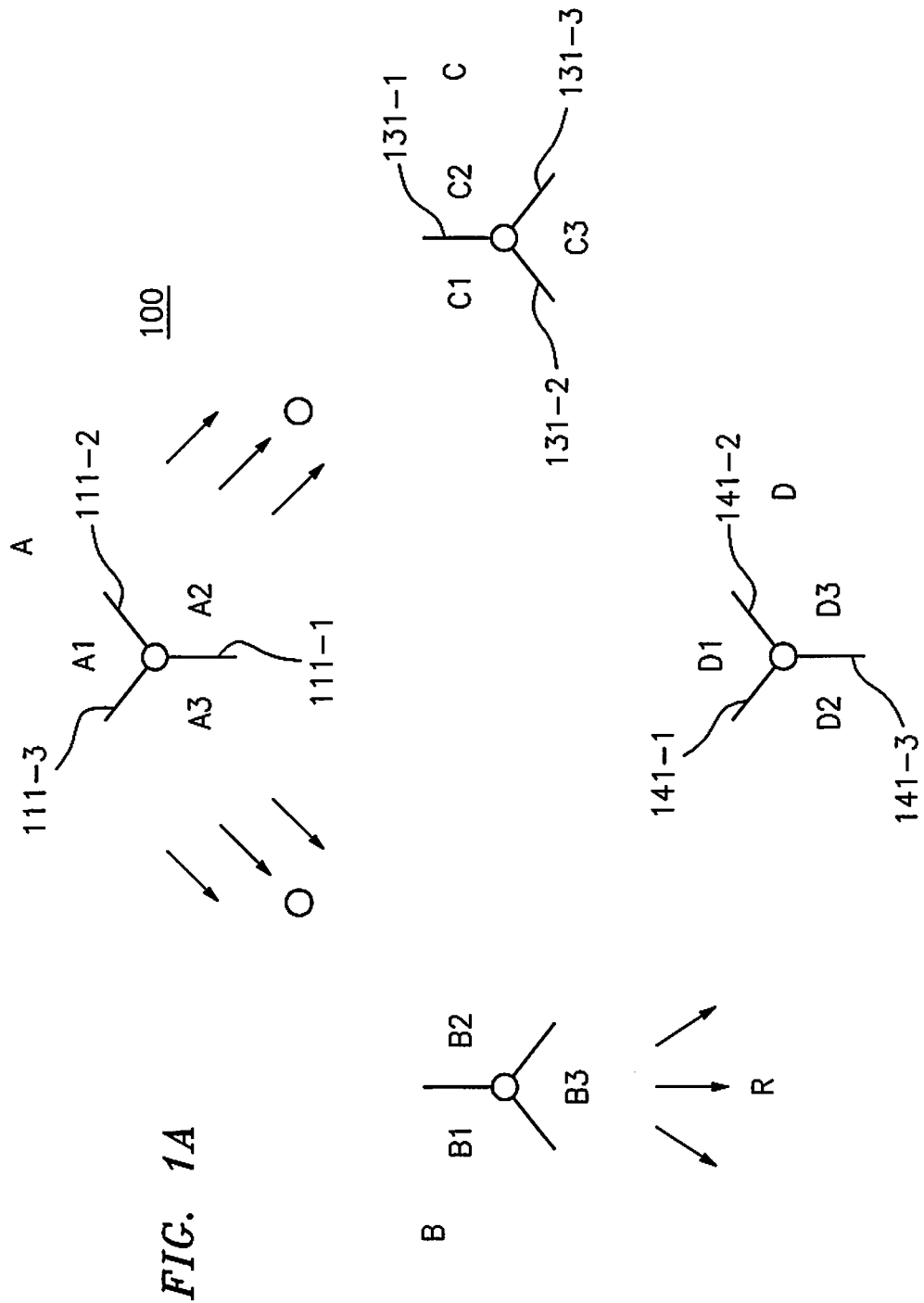
FIGS. 1A and 1B depict a wind farm having four nodes, showing varied packet transmission after yaw of a nacelle of a first node.
Figure 1B:
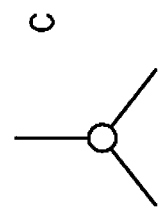
Figure 1B:
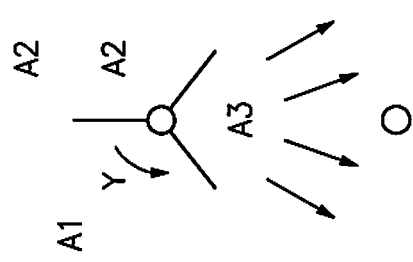
Figure 1B:
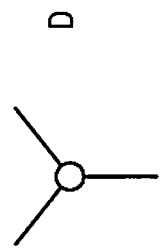
Figure 1B:
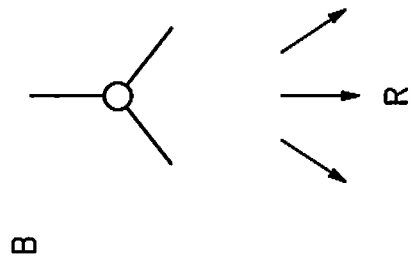

FIGS. 1A and 1B provide a simplified plan view of a four node network, i.e. Nodes A, B, C and D. In a preferred embodiment, each of Nodes A through D includes a three (3) sector directional antenna, for transmission and reception of respective sectors, e.g. sectors A-1, A-2, A-3, emanating from each node. Each node may further include a computer embedded within a nacelle of a wind turbine. In the network depicted in FIGS. 1A and 1B, Node D is positioned beyond transmission range of Node A, with Node D relying on rebroadcast via Node B and/or Node C, as described below.

FIG. 1A shows Nodes A through D in first yaw positions. FIG. 1B shows Nodes B, C and D each in the first yaw position but with Node A having moved to a second yaw position that is more than a threshold amount, which in a preferred embodiment is a rotation angle greater than five degrees (5°) but will vary depending on empirical values obtained during network training, relative node positions and transmission characteristics. The threshold amount is preferably reduced as the number of antennas and sectors for a node is increased.

In a preferred embodiment, transmission from Node A, as an originator node, is performed based on routing information stored in a memory, i.e. preferred link transmissions, which can be stored and calculated in a central location. Updated routing information is provided to the nodes upon detection of node yaw beyond a threshold amount. In wind farm and similar applications it is recognized that yaw movement is often controlled and typically does not occur at a rapid pace, reducing the number of database updates provided to the nodes.

The provided preferred link broadcast, i.e. routing information, is computed such that the total number of transmissions is reduced while ensuring that transmission is made to all nodes in the network, effectively eliminating redundant transmissions. In the preferred embodiment, where the database, list, or memory is centrally located, a central controller node is responsible for computing and updating this database. This controller receives updated yaw angles from the nodes upon detection of yaw beyond the specified threshold amount.

In a preferred embodiment, a system is provided for data transmission via a multi-node wireless network that is provided in a geographic area 100 having more than two nodes, as shown in FIGS. 1A and 1B. Each node is stationary, having a set geographic position stored in a list, database or memory, preferably in values of latitude and longitude.

The data transmission is typically in a data packet format for wireless communication between non-adjacent nodes by rebroadcast via adjacent nodes. As described herein, rebroadcast occurs over preferred link transmissions of certain adjacent nodes, thereby reducing redundant transmissions.

A plurality of antennas is affixed to each node, typically by fixing the antennas to a nacelle that rotates about a vertical axis, i.e. yaws. Each node, while being fixed in a geographic location, includes a component that rotates about the vertical axis, with such rotation typically being of a nacelle occurring independent of rotation of nacelles of other nodes. As used herein, each node is associated with a nacelle of a wind turbine, and the geographic area refers to a wind farm.

Each node includes a minimum of two directional antennas, e.g. 111-1, 111-2, that each performs transmit/receive function of data packets for that node. The data packets are transmitted throughout the network via hopping between adjacent nodes.

The directional antennas 111-1, 111-2 are positioned to cover different sectors, each emanating from and providing radio frequency coverage around each node, preferably with sectors that do not overlap. The database that stores node position information also communicates to each node preferred link transmissions of aligned sectors of adjacent nodes.

As known to those of skill in the art, a compass or similar detector is included to detect a degree of yaw of the nacelle relative to the tower on which the nacelle is rotatably mounted. When a node is detected to rotate beyond the threshold amount, a changed alignment is identified and an identification of revised preferred link transmissions is provided to each node in the geographic area 100, with such detection being made either at the node or by a central controller. Based on the preferred link transmissions, the data packet is retransmitted to one or more specifically identified antennas of each transmitting node.

As shown in FIG. 1A, Node A, acting as an originating source for network-wide broadcast of a message (O), transmits the data packet in second and third sectors via directional second and third antennas (111-2, 111-3), which is received by Nodes B and C.

In some embodiments, rebroadcast of the message (R) by Nodes B and C is contingent on permissions provided via routing information provided in the database. For the first yaw position shown in FIG. 1A, the routing information for messages originating from source Node A is set forth in Table 1.

TABLE 1

| Tx Node | Ant. 1 | Ant. 2 | Ant. 3 |
|---|---|---|---|
| A | No | Yes | Yes |
| B | No | No | Yes |
| C | No | No | No |
| D | No | No | No |

FIG. 1B shows Node A having rotated to the second yaw position. When in such position, the revised routing information for messages originating from source Node A is set forth in Table 2.

TABLE 2

| Tx Node | Ant. 1 | Ant. 2 | Ant. 3 |
|---|---|---|---|
| A | No | No | Yes |
| B | No | No | Yes |
| C | No | No | No |
| D | No | No | No |

In FIG. 1A, the network message is propagated to all nodes in three transmissions. In FIG. 1B, the network message is propagated to all nodes in two transmissions. In comparison, conventional, naïve flooding broadcast protocol propagates the message in twelve (4×3) transmissions, since each antenna on each node must transmit once. Accordingly, channel congestion is reduced, particularly for networks having four or more nodes. One of ordinary skill in the art will recognize that the nodes can also be configured with two or more sectors emanating from each node.

As will be noted from the above, the antennas identified by the routing information will transmit on sectors corresponding to known coordinate values of adjacent nodes. Also, the message packet will typically include in a header thereof an identifier of the originator node (Node A). Based on the known positions of each node in the network, Node D will recognize that no further rebroadcast is needed.

In a preferred embodiment, geographical positions of each node corresponding to a turbine in the wind farm are mapped, and the mapped positions are stored in a list or memory of a database.

As described above, at least two directional antennas are mounted on each turbine and each directional antenna is focused on a different sector emanating from the node. A predetermined preferred link transmission table that identifies directional antennas aligned with an adjacent node is provided to each node. The yaw of each turbine is determined. When yaw of the turbines is within the threshold amount, data packets are wirelessly communicated between adjacent nodes using directional antennas identified in the preferred link transmission table. When the yaw of any turbine is determined to exceed the threshold amount, a revised preferred link transmission table is calculated based on the determined yaw, and the revised preferred link transmission table is transmitted for use by each node. Thereafter, subsequent data packet transmission is only performed by those directional antennas identified in the revised predetermined preferred link transmission table.

Figure 2:
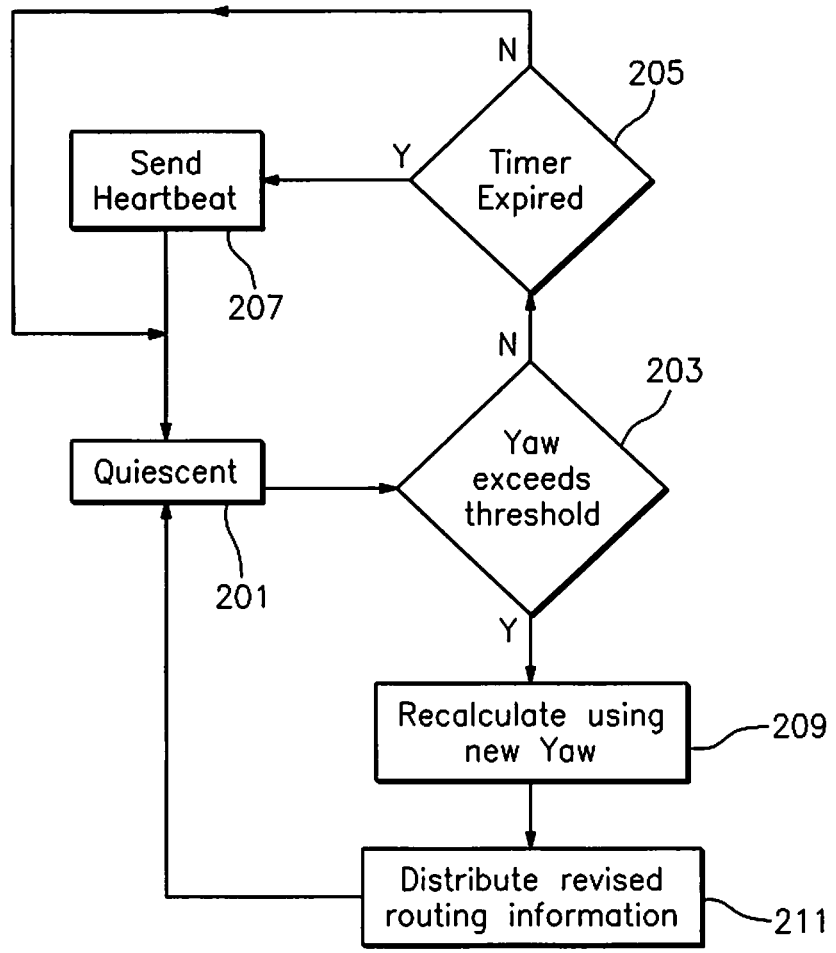
FIG. 2 is flowchart of a method of the disclosed method.

FIG. 2 is a flowchart depicting an operation of a preferred embodiment. In step 201, the system is in a quiescent state, waiting for timer expiry or receipt of a signal indicating that one or more nodes have experienced yaw in excess of the threshold amount set for that respective node of the network.

If in step 203 it is determined that an excessive yaw has not been received or occurred, a determination is made of whether the timer has expired in step 205. If in step 205 it is determined that the timer has not expired, the system returns to the quiescent state of step 201.

If in step 205 it is determined that the timer has expired, in step 207 a controller, preferably centrally located, that manages the database sends a heartbeat message to the nodes. Upon receipt of the heartbeat message, each node responds to the controller by providing a current yaw position, which the controller compares to maintained prior positions to confirm accuracy of the preferred link identifications previously provided to the nodes. In a preferred embodiment, if a node does not receive the heartbeat message within one or more timer intervals, the node will default to a conventional transmission protocol and retransmit any received data packets via transmit antennas, rather than only the antenna(s) identified by the preferred link identifications, thereby operating in a failsafe mode.

If in step 203 it is determined that an excessive yaw has been received, a recalculation is performed in step 209 based on the new yaw angle that is in excess of the threshold amount, with the calculation utilizing database information including the position of each node, and the previously reported yaw angles of nodes not reported to have exceeded their respective threshold amount.

In step 211 the recalculated information is transmitted to the nodes as revised preferred link identifications for use by each node. The method then returns to step 201.

Calculation of the preferred link transmission table is preferably performed at the central controller based on the current yaw positions of the nodes. When yaw exceeds the specified threshold amount, the new yaw position is communicated to the central controller. The central controller maintains GPS locations of the nodes in the network and respective last known yaw positions. Thus, the controller can identify whether direct communication between two given nodes is possible via a specific set of antennas. For example, in FIG. 1A, the controller knows that direct communication between nodes A and C is possible using antennas A2 and C1, but not using A3 and C3, or using A1 and C2. The controller makes this determination based on knowledge of respective nodes locations, yaw positions and radio ranges.

Thus, the controller determines a network connectivity graph having each graph link labeled by antenna pairs available for communication on that link.

The controller preferably also runs a breadth-first search algorithm on the network connectivity graph beginning with an originating node that starts a broadcast flood. In the breadth-first search, only those sets of antennas are chosen to visit a next level of nodes that minimize a total number of antennas to be used to visit this next level, creating a chosen set of antennas for each node to form the preferred link transmission table.

While the disclosed method has been shown and described with reference to certain embodiments thereof, it will be understood by those skilled in the art that various changes in form and details may be made therein without departing from the spirit and scope of the present invention as defined by the appended claims and equivalents thereof.

What is claimed is:

1. A system for wireless data transmission in a wind farm, the system comprising:
   a plurality of nodes each including a wind turbine with a plurality of directional antennas mounted thereon, wherein each of the plurality of directional antennas is focused in a different sector emanating from each node; and
   a memory including routing information identifying alignment of directional antennas of adjacent nodes,
   wherein a data packet transmitted by one node is wirelessly re-transmitted by adjacent nodes to each of the plurality of nodes by directional antennas identified by the routing information,
   wherein, upon detection of wind turbine yaw exceeding a threshold amount, revised routing information is calculated and transmitted to each node, and
   wherein rebroadcast of the data packet is performed by directional antennas identified by the revised routing information.

2. A method for wireless data transmission in a wind farm, the method comprising:
   mapping positions of a plurality of wind farm turbines, wherein each of the plurality turbines includes at least two directional antennas mounted thereon, with each directional antenna focused on varying sectors emanating from the respective turbines;
   storing the mapped positions in a database;
   providing to each turbine a preferred link transmission table identifying aligned directional antennas of adjacent turbines;
   determining yaw of each turbine; and
   calculating, when the yaw of a turbine is determined to exceed a threshold amount, a revised preferred link transmission table based on the determined yaw, and transmitting the revised preferred link transmission table to each turbine,
   wherein, when the yaw of any turbine is determined to exceed the threshold amount, packet rebroadcast is limited to directional antennas identified in the revised preferred link transmission table.

3. The method of claim 2, wherein, when yaw of the turbine is not determined to exceed the threshold amount, packet rebroadcast is limited to directional antennas identified in the preferred link transmission table.

4. The method of claim 2, wherein different sectors of each turbine do not overlap.

5. The method of claim 2, wherein each turbine independently rotates about a vertical axis.

6. The method of claim 2, wherein a set geographical position of each of the plurality of turbines is identified by respective latitude and longitude values.

7. The method of claim 2, wherein the directional antennas are mounted on a nacelle of each turbine.

8. A system for data transmission in a wireless network, the system comprising:
   a plurality of wind turbines each having a plurality of directional antennas mounted thereon, with each of the plurality of directional antennas focused in a different sector emanating from respective turbines; and
   a memory including routing information identifying aligned sectors of adjacent turbines,
   wherein detection of turbine yaw beyond a threshold amount identifies a changed alignment of adjacent sectors,
   wherein, upon identification of the changed alignment of the adjacent sectors, revised routing information is provided, and
   wherein, upon identification of the changed alignment of the adjacent sectors, data packet transmission between adjacent turbines utilizes directional antennas identified by the revised routing information.

9. The system of claim 8, wherein different sectors of each turbine do not overlap.

10. The system of claim 8, wherein each of the plurality of turbines includes an embedded computer fixed on a nacelle thereof.

11. The system of claim 8, wherein a set geographical position of the plurality of turbines is identified by respective latitude and longitude values of each turbine.

* * * * *